April 27, 1948.  S. H. M. DODINGTON  2,440,253
PULSE RADAR INTERFERENCE PRODUCER
Filed July 4, 1944   3 Sheets-Sheet 1

INVENTOR.
SVEN H. M. DODINGTON
BY
ATTORNEY

April 27, 1948. S. H. M. DODINGTON 2,440,253
PULSE RADAR INTERFERENCE PRODUCER
Filed July 4, 1944 3 Sheets-Sheet 2
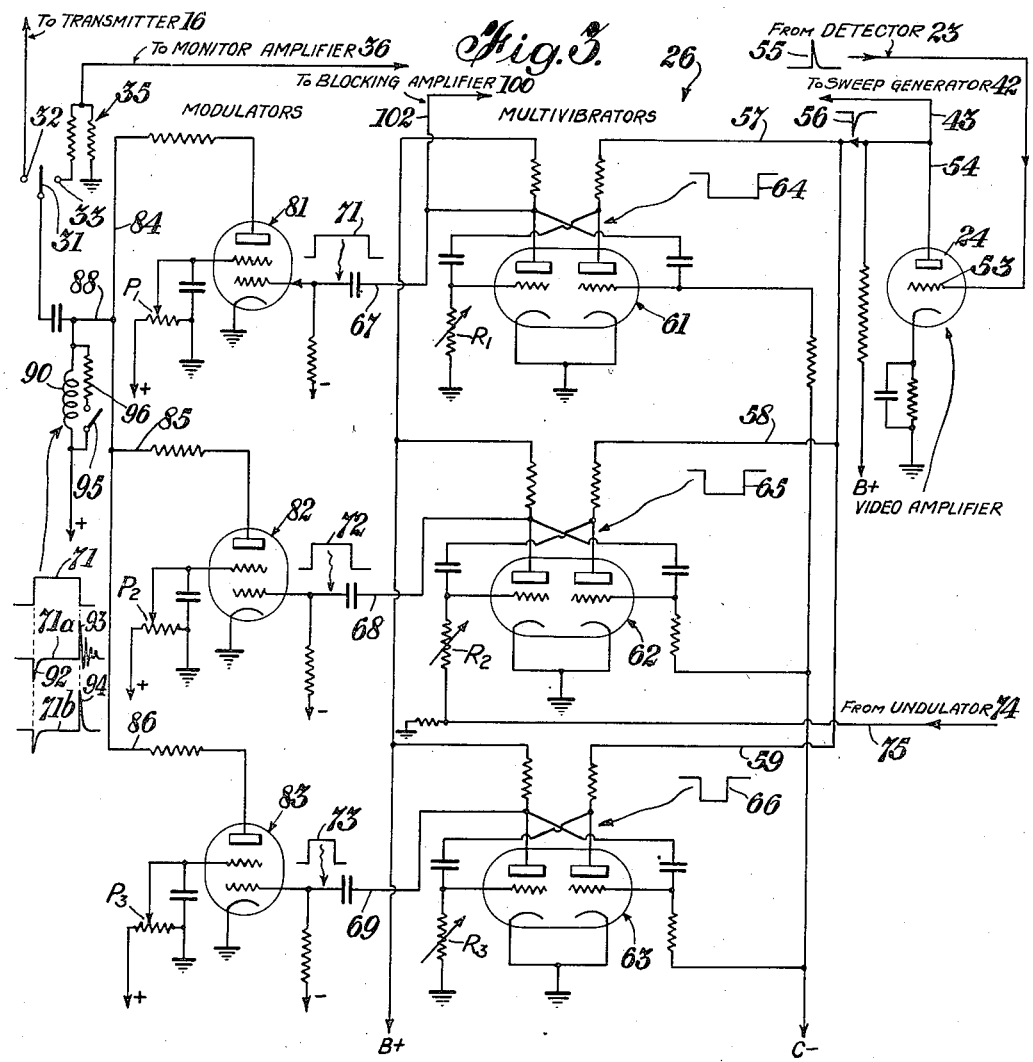
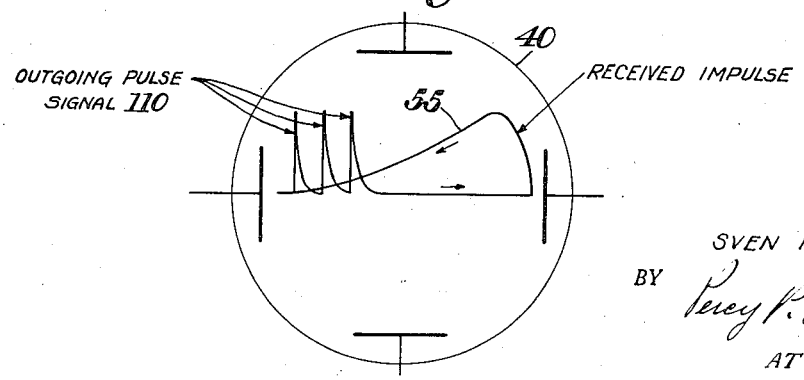
INVENTOR.
SVEN H. M. DODINGTON
BY
ATTORNEY

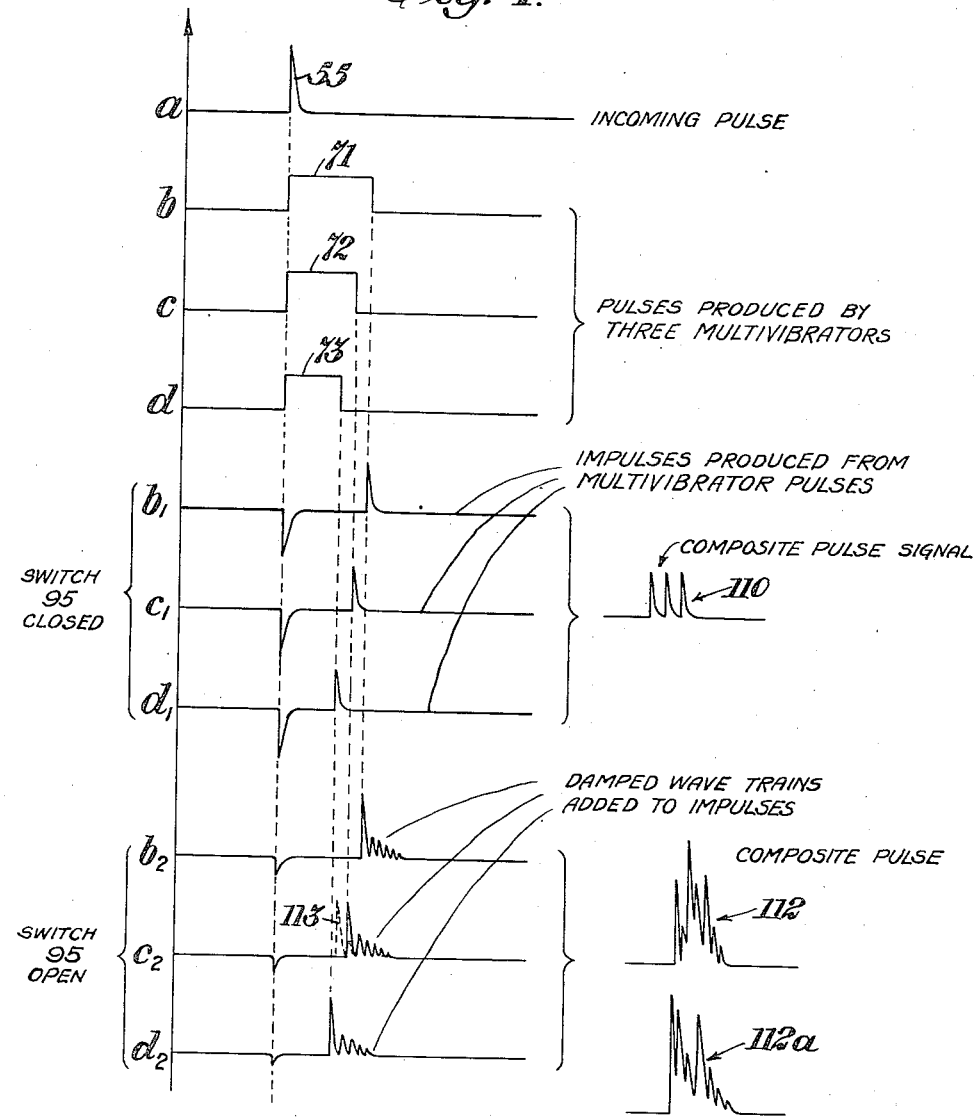

Patented Apr. 27, 1948

2,440,253

UNITED STATES PATENT OFFICE 2,440,253

PULSE RADAR INTERFERENCE PRODUCER

Sven H. M. Dodington, Forest Hills, N. Y., assignor to Federal Telephone and Radio Corporation, New York, N. Y., a corporation of Delaware Application July 4, 1944, Serial No. 543,454

18 Claims. (Cl. 250—1.76)

This invention relates to radio repeaters and more particularly to a system for intercepting radio impulses or waves transmitted by radio locating systems and for transmitting in response thereto simulated reflections of obstacles such as aircrafts and ships.

In the copending applications of Edmond M. Deloraine and Henri G. Busignies, Serial No. 436,846, filed March 30, 1942, and applicant's copending application, Serial No. 480,603, filed March 26, 1943, pulse repeating and reflection falsifying systems are disclosed which operate, in response to the reception of impulses or waves transmitted by a radio locating system, to transmit return pulses or waves of such strength and time retardation as to simulate a ship or aircraft at some selected distance from the radio locating system. These systems are particularly useful in warfare to mislead and confuse the operators of enemy radio locating systems.

It is one of the objects of my present invention to improve upon the reflection falsifying systems of the aforementioned applications by providing a system capable of producing falsifying signals closely simulating the reflections that might be expected of a convoy or squadron of ships or aircraft.

Another object of the invention is to provide a method and means for producing in response to the reception of radio impulses a composite pulse signal simulating the reflection of a group of reflecting obstacles and to effect substantially continuous change in the signal to further simulate change in the position of the obstacles as might occur during maneuvering of ships or during flight of a squadron of aircraft.

Another object of the invention is to provide a repeater system with means for indicating the form of the received impulses and also the formation of repeater signals and their timed relation with respect to the impulses, thereby enabling an operator to monitor the repeater according to the form of the received impulse, the character of the reflecting obstacle or obstacles to be simulated and the apparent distance of the falsely indicated obstacles from the radio locating system transmitting the radio impulses.

Still another object of the invention is to provide a signal generator for producing composite pulse signals.

The above and other objects ancillary thereto will become more clear upon consideration of the following detailed description to be read in connection with the accompanying drawings, in which:

Fig. 3 is a schematic wiring diagram of the signal generating feature of the repeater;

Fig. 4 is a graphical illustration used in explaining the operation of the generator; and Fig. 5 is a schematic showing of the screen of an oscillograph of Fig. 2 showing the shapes of a received pulse and a composite pulse to be transmitted in response thereto.

Figure 1:
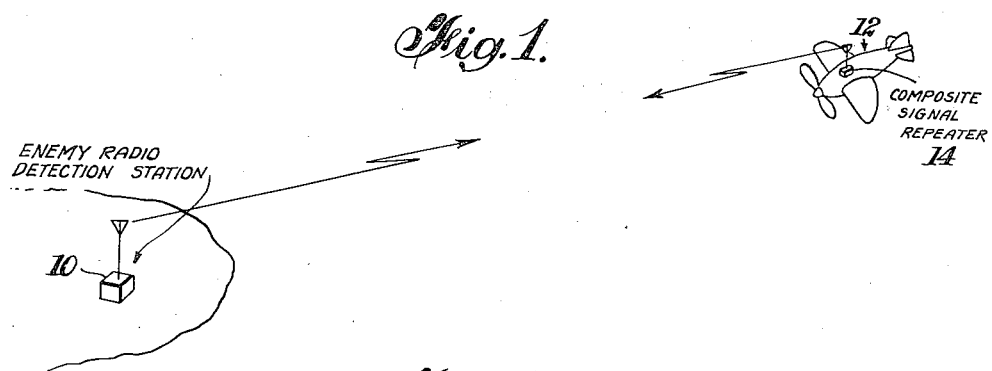
Fig. 1 is a schematic diagram showing one of the uses of the invention.

One of the uses of this invention is shown in Fig. 1. Assume, for example, that the enemy has a radio locating system as indicated at 10 for transmitting impulses and for receiving and indicating reflections of obstacles such as ships and aircraft. Such systems include means to determine elevation, azimuth and distance of the reflecting obstacle. According to the principles of this invention, a single airplane 12 may be provided with a radio repeater system 14 of the character described in detail hereinafter which is capable of detecting radio impulses and to transmit in response thereto composite pulse signals simulating the reflections of a squadron of airplanes in flight. The radio repeater system, of course, may be carried by a small boat or otherwise strategically located to simulate the reflection of a convoy, squadron of warships or a group of other reflecting obstacles and thereby deceive and confuse the enemy. The composite pulse signal preferably is made to constantly vary in its appearance so as to indicate realistically the reflection of a group of obstacles in motion.

Figure 2:
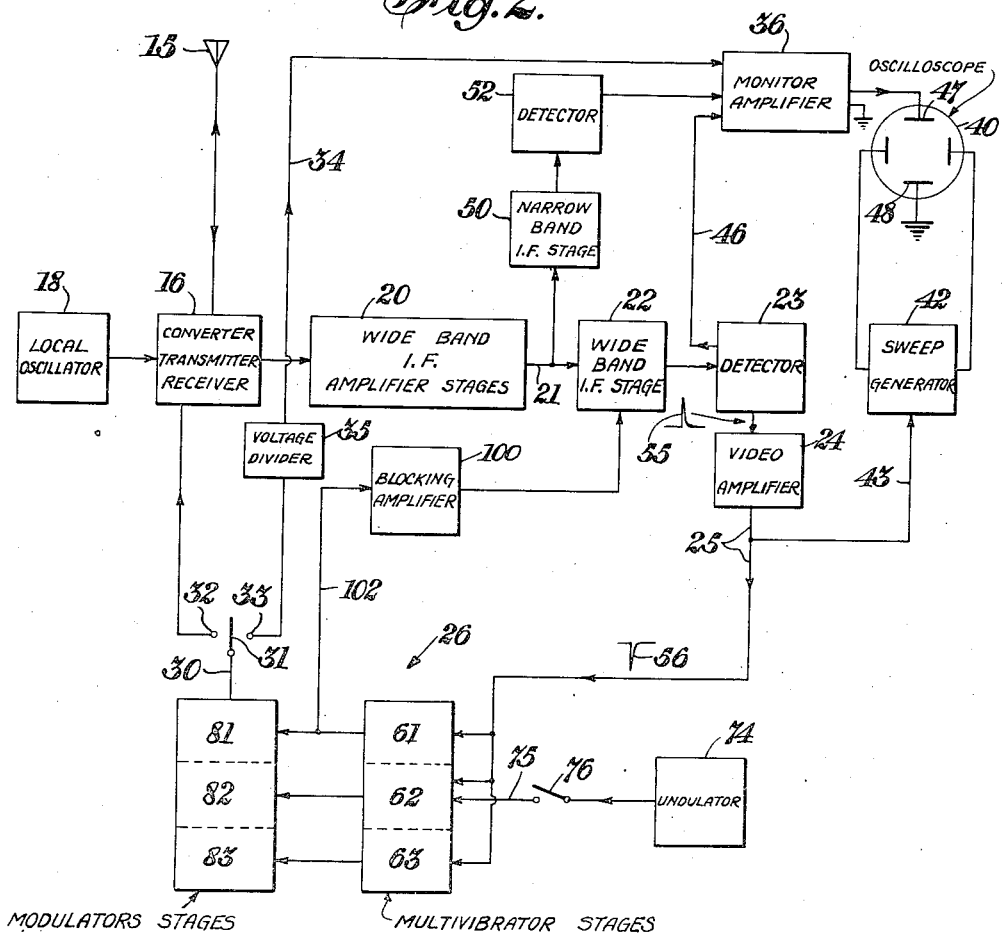
Fig. 2 is a schematic block diagram of a composite signal repeater according to the principles of the invention.

The block diagram of Fig. 2 shows schematically the parts of the radio repeater system of the invention. A two-way antenna 15 is connected to a converter transmitter-receiver unit 16 associated with a local oscillator 18 by which radio frequency or ultra high frequency waves are beat down to intermediate frequencies for application to wide band I. F. amplifier stages 20. For details of the parts 16, 18 and 20, reference may be made to my aforesaid copending application Serial No. 480,603.

Connected to the output 21 of the I. F. stages 20 is an additional wide band I. F. stage 22 and a detector 23. The output of the detector 23 is connected to a video amplifier 24 which is connected by line 25 to a signal pulse generator 26 adapted to produce the composite pulse for simulating the reflection of a group of obstacles. The output 30 from the generator 26 includes a movable contact 31 adapted to be moved selectively into circuit connection with contacts 32 and 33. When the circuit connection is through contacts 31, 32 the composite pulse produced by generator 26 is applied to the converter unit 16 for transmission. When the circuit connection is through contacts 31, 33 the composite pulse signal is applied over line 34 through voltage divider 35 to a monitor amplifier 36.

It will be understood that in order to simulate realistically the reflections of a group of obstacles in response to a radio impulse, not only the formation of the composite signal must be predetermined but also the shape of the radio impulse and the time relation between the signal and such impulse must be checked. This is accomplished by providing the system with a cathode ray oscilloscope 40 having a sweep generator 42 connected by line 43 to the output connection 25 of the amplifier 24, whereby the sweep potential produced for the oscilloscope is timed with the reception of the radio impulses. Energy of the received impulses is also applied from the detector 23 over line 46 to the monitor amplifier 36. Thus, the received impulse and also the generated signal may be applied across the deflecting plates 47 and 48 of the oscilloscope, whereby a tracing showing the shapes and the time and amplitude relationship of the impulse and signal can be viewed by the operator. While the movable contact 31 is closed with contact 33 the pulse signal generated will not be transmitted. This arrangement enables the operator to first monitor and thereby obtain the desired formation and amplitude of the composite signals and the desired time relation thereof with respect to the received impulses before transmission.

During transmission, the composite pulse produced by the generator 26 is applied through contacts 31, 32 to the converter unit 16. During this transmission, however, the signal pulse is also applied through the converter to the I. F. stages 20 from which the energy is permitted to pass through a narrow band I. F. stage 50 to a detector 52 connected to the monitor amplifier 36. During transmission, the I. F. stage 50 responds to the outgoing signal as well as to the incoming impulse and the connection 46 from the detector 23 feeds an additional amount of the incoming signal to the amplifier 36 so that when both the outgoing and incoming signals are about the same amplitude on the oscilloscope, the amplitude adjustment for the composite pulse signal is proper for most purposes. The band of the I. F. stage 50 being narrow, it will be clear that when both the transmitted and received signals are tuned to appear simultaneously at their maximum amplitudes they will then be at substantially the same frequency. This adjustment of frequency for the purpose of simulating reflections for radio location systems is sufficiently accurate for the purpose of the invention.

Referring now to Fig. 3 which shows a schematic circuit diagram of the signal generator 26, it will be noted that the video amplifier 24 is shown at the input thereof as including a vacuum tube having a control grid 53 fed with impulse energy 55 from detector 23. The pulse energy 55 is inverted as indicated at 56 and is applied over anode output connection 54 through parallel connections 57, 58 and 59 to a plurality of multivibrators 61, 62 and 63. These multivibrators are of a character commonly known as "flip-flop" oscillators and therefore need not be described in detail except to point out that the time constants of multivibrators are controlled by adjustable resistors $R_1$, $R_2$ and $R_3$ respectively. By properly adjusting these resistors, the multivibrators when triggered from a normal state of operation to a second state of operation will cause the multivibrators to return back to the normal state of operation after predetermined time delays according to the adjustment of their respective resistor. The multivibrators produce negative rectangular pulses 64, 65 and 66 respectively, on the plate input circuits to which the negative synchronizing impulse 56 is applied, and positive rectangular pulses 71, 72 and 73 respectively, on opposite plate output circuits 67, 68 and 69 respectively. The durations of the rectangular pulses are determined by the respective settings of the resistors $R_1$, $R_2$ and $R_3$ which, in effect, control the time delay interval between the reception of radio impulses and the transmission of composite pulse signals. When the impulse energy 56 is of insufficient amplitude, the multivibrators may fire at some sub-multiple of the impulse repetition frequency but this should normally only occur when the receiver is mistuned or else is too far away from the radio locating station.

In order to provide variation in the composite signal to produce the effect of relative movement by the obstacles the reflections of which are to be simulated, I provide for the continuous variation, at a slow rate, of the time constants of one of the multivibrators. For this purpose, the output voltage of a known form of undulator 74 (Fig. 2) is applied through line 75 and switch 76 to the delay resistor $R_2$ of multivibrator 62, for example, the undulator comprising a known form of resistor-capacity, low frequency oscillator arranged to produce a complex undulation voltage. This undulated voltage applied to the resistor $R_2$ operates to vary the duration of the rectangular pulse 72 which, as hereinafter pointed out in detail, alters continuously the formation of the composite pulse signal.

The positive output pulses 71, 72 and 73 are applied to the grids of modulator tubes 81, 82 and 83 respectively. These tubes are normally biased at or near cut-off and are driven to saturation by the rectangular pulses. The plates of these tubes are connected in parallel by lines 84, 85 and 86 and the common output connection 88 thereof includes a choke coil 90 which produces a negative pulse 92 in response to the leading edge and a damped pulse wave 93 in response to the trailing edge of each rectangular pulse, such as shown, for example by curve 71a (Fig. 3). As the leading edge of pulse 71 is applied to the grid of modulator tube 81, for example, current is drawn through the choke coil 90 thereby producing, during the initial flow, the negative pulse 92. Since the trailing edge of pulse 71 is sharp, this causes a sudden stoppage of current flow through tube 81 producing the damped oscillation 93 to occur in the coil 90. By closing switch 95 thereby connecting resistor 96 across the choke coil 90, a critically damped resonant circuit is produced. This changes the wave form from that shown by curve 71a to curve 71b, wherein a single positive pulse 94 is produced in place of the damped pulse wave 93. The amplitudes of the pulses 93 or 94, as the case may be, are controlled by variable potentiometers $P_1$, $P_2$ and $P_3$ associated with tubes 81, 82 and 83.

When the resulting wave form produced by the pulse generator is applied through circuit contacts 31 and 32 to the converter unit 16, the R. F. oscillator thereof bursts into R. F. oscillation and the amplitude of this oscillation is to a large extent dependent on the amplitude of the plate voltage of such oscillator and the wave form generated by the pulse generator 26.

The oscillation of the transmitter will beat against the local oscillator 18 to produce an intermediate frequency which is applied to the wide band I. F. stages 20. To avoid singing of the repeater and improper triggering of the multivibrators during composite signal generation and transmission, the system is provided with a blocking amplifier 100 (Fig. 2) which is fed by the rectangular pulse 71 over connection 102 from the multivibrator 61 which is adjusted to provide the widest rectangular pulse. The blocking amplifier preferably includes an R-C circuit which imposes a slight delay upon the rectangular pulse energy before it is applied to the I. F. stage 22. The positive rectangular pulse is inverted to negative polarity by the amplifier 100 and is applied to the grid of the I. F. stage 22 whereby the stage is blocked until transmission of the composite signal is complete.

It will be observed, however, that the narrow band I. F. stage 50 is not blocked so that energy of the composite pulse signal will be applied to the deflecting circuit of the oscilloscope 40 during transmission.

The operation of the system will be more clear to the reader upon considering the graphical illustration of Fig. 4. Curve $a$ represents the radio impulse energy 55 detected by the system. When this impulse energy is applied to the multivibrator circuits, rectangular pulses 71, 72 and 73 of the different widths indicated by curves $b$, $c$ and $d$ are produced. When these rectangular pulses are applied to the modulator circuits with the switch 95 closed, a pulse output according to curves $b_1$, $c_1$ and $d_1$ is produced, the positive pulses of which combine to produce the composite pulse 110. When the switch 95 is open, the resulting pulse output is according to the curves of $b_2$, $c_2$ and $d_2$, the positive pulse wave of which produces, when combined, the composite pulse 112.

It will be noted that the composite signal 112 is a more realistic reflection simulation of a group of obstacles than the composite signal 110. These are but two examples of several different forms of composite pulses that may be produced by making various adjustments. It will also be understood that while three multivibrator circuits are shown that additional multivibrator circuits may be provided to add further to the composite signal formation.

The continuous variation produced by the undulator 74 is adapted to vary the position of one of the pulses or pulse trains relative to the others produced by the pulse generator 26. This, in effect, produces a realistic variation in the reflection signal closely simulating the reflection of a group of moving obstacles. Signal 112a, for example, illustrates the change produced in signal 112 by the change indicated in broken lines 113 on curve $c_2$.

Fig. 5 shows the appearance of the received impulse and the outgoing signal as viewed upon the screen of the oscilloscope 40. Since the received impulse triggers the sweep of the oscilloscope, the tracing from the right to the left first traces the shape of the received impulse and then the shape of the outgoing signal. The overlapping relation of the impulse and the signal pulses depends, of course, upon the amount of delay introduced by the width of the rectangular pulses and also the sweep rate of the oscilloscope. By observing the screen of the oscilloscope, it is therefore possible for the operator to adjust for the desired delay, the proper power or amplitude for the outgoing pulse signals and the rate of change to be produced in the signal by the undulator 74.

From the foregoing, it will be clear that according to the principles of my invention it is possible now to produce false reflections closely simulating the reflections that might be expected of a given group of obstacles such as a squadron of aircraft or a convoy or squadron of ships. It is also possible by various adjustments to change the composite pulse signal to simulate various groupings of obstacles as well as relative movement between the obstacles such as occur during the flight of a squadron of aircraft and in the maneuvering of a squadron of ships.

While I have shown and described the principles of my invention in connection with specific apparatus, it will be understood that the method of producing the composite signal may be performed by other apparatus as well. For example, the composite signal may be produced by an arrangement of delay devices other than multivibrators together with clipping circuits and differentiators or the like for producing the desired pulses from which the composite signal is produced. It will be understood, therefore, that the specific apparatus herein shown and described is to be regarded as illustrative of the invention only and not as limiting the scope of the invention as set forth in the objects and the appended claims.

I claim:

1. The method of simulating in response to a train of radio impulses the reflections that would be produced by a given group of reflecting obstacles comprising producing a plurality of trains of pulses, timing separately each train of pulses with respect to the other trains of pulses to simulate by means of each of said trains of pulses the reflection of one of said obstacles according to size and position thereof relative to the other of said group of obstacles, and mixing said trains of pulses together to produce composite signals simulating the reflection characteristics of said group.

2. The method defined in claim 1 wherein the timing of said trains of pulses includes the step of varying continuously the timing of at least one of said trains of pulses thereby simulating relative movement of said obstacles by the resulting variations produced thereby in said composite signal.

3. The method defined in claim 1 wherein the production of said plurality of trains of pulses includes the step of translating each pulse thereof into a short damped pulse wave so that when the trains of pulses are mixed corresponding portions of the pulse waves will combine to produce realistic reflections of a mixed group of objects.

4. The method defined in claim 1 wherein the production of said plurality of trains of pulses includes the step of translating each pulse thereof into a short damped pulse wave, and the timing of each train of pulses includes the step of varying substantially continuously the timing of at least one of said trains, thereby producing when said short damped pulse waves are combined a composite reflection signal the formation of which varies continuously to simulate realistically the reflection of a group of moving obstacles.

5. A repeater system for falsely simulating the reflection of a group of obstacles in response to a radio impulse comprising means for detecting radio impulses, pulse generating means responsive to energy of a detected impulse to produce a composite pulse signal simulating the reflection characteristics of said group of obstacles, and means to transmit said composite pulse signal at substantially the same carrier frequency at which said impulse was detected.

6. The system defined in claim 5 wherein the pulse generating means includes a plurality of means each responsive to the received impulse to produce a plurality of pulses each of which is timed separately from the timing of the other of said pulses, and means for combining the pulses thus produced to form said composite signal.

7. The system defined in claim 5 wherein the pulse generating means includes a plurality of means each responsive to the received impulse to produce a plurality of pulses each of which is timed separately from the timing of the other of said pulses, means for combining the pulses thus produced to form said composite signal, and means varying the timing of at least one of said pulse producing means, thereby producing changes in the formation of the composite signals.

8. The system defined in claim 5 wherein the pulse generating means includes means for producing differently timed damped pulse waves and means to combine said waves to form said composite pulse signal.

9. A repeater system for falsely simulating the reflection on a group of obstacles in response to a train of radio impulses comprising means for detecting said radio impulses, a plurality of pulse generating means each responsive to the energy of a detected train of impulses to produce a corresponding train of pulses, the trains of pulses each being timed separately from the other trains of pulses, means for mixing together the pulse trains, whereby corresponding pulses thereof combine to produce a train of composite pulse signals simulating the reflection characteristics of said group of obstacles, and means to transmit said composite pulse signals at substantially the same carrier frequency at which said impulses are detected.

10. The system defined in claim 9 in combination with means for varying continuously the timing of one of the pulse producing means, whereby the pulses produced thereby alter continuously the formation of the composition pulse, thereby simulating movement by said obstacles.

11. A repeater system for falsely simulating the reflection on a group of obstacles in response to a train of radio impulses comprising means for detecting said radio impulses, a plurality of pulse generating means each responsive to the energy of a detected train of impulses to produce a train of pulses, each said pulse producing means including a multivibrator adapted to be triggered from a normal state of operation to a second state of operation by the energy of a detected impulse, said multivibrators each having different time constants whereby they revert back to said normal state of operation at different time intervals after the triggering operation, thereby producing a plurality of rectangular pulses each differing in width from the others, means to translate said rectangular pulses into narrow width pulses corresponding in time to the leading and trailing edges of said rectangular pulses, means for mixing the narrow width pulses corresponding to said trailing edges whereby they combine to produce a train of composite pulse signals simulating the reflection characteristics of said group of objects.

12. The system defined in claim 11 in combination with means for producing a varying voltage, and means for applying said varying voltage to one of said multivibrators for varying the time constants thereof, thereby changing continuously the width of the rectangular pulses produced thereby.

13. The system defined in claim 11 wherein the means for translating said rectangular pulses includes a modulator tube having a grid circuit and a plate circuit with a choke coil therein, and means for applying the rectangular pulse energy to the grid of said tube, whereby a short damped pulse wave is produced in said plate circuit in time relation to the trailing edge of each rectangular pulse.

14. A composite signal producing generator comprising a plurality of multivibrators connected together in parallel circuit arrangement, means for applying an impulse to said multivibrators for triggering them from a normal state of operation to a second state of operation, each of said multivibrators having means to control the time constants thereof whereby the multivibrators may be adjusted to return from the second state of operation to said normal state of operation to produce rectangular pulses of selected widths, a plurality of means each for translating the rectangular pulses produced by one of said multivibrators to produce narrow pulses corresponding in time with the leading and trailing edges of the rectangular pulses, and means for mixing the pulse output of said plurality of means, whereby the narrow width pulses corresponding to the trailing edges of said rectangular pulses combine to form the composite pulse signals.

15. The pulse generator defined in claim 14 in combination with undulator means having a source of variable voltage, and means for applying said variable voltage to the time constants control means of at least one of said multivibrators whereby the rectangular pulse produced thereby is varied in width according to variations in said voltage.

16. The signal generator defined in claim 14 wherein each means for translating said rectangular pulses includes a modulator tube having a grid circuit and a plate circuit with a choke coil therein, and means for applying the rectangular pulse energy to the grid of said tube, whereby a short damped pulse wave is produced in said plate circuit in time relation to the trailing edge of each rectangular pulse.

17. A repeater system for falsely simulating the reflection of a group of obstacles in response to radio impulses comprising means for detecting radio impulses, a cathode ray oscilloscope, means for producing a sweep potential for said oscilloscope timed to the reception of said radio impulses, pulse generating means responsive to energy of each radio impulse to produce a pulse signal simulating the reflection characteristics of said group of obstacles, a deflecting circuit for said oscillograph, and means for applying energy of the detected impulses and the energy of said generated pulse signals to said deflection circuit, whereby the formation of the detected impulses may be observed and the formation and timing of the pulse signals with respect to said detected impulses may be observed and monitored, and means for transmitting said pulse signals at substantially the same carrier frequency at which said impulses are detected.

18. The system defined in claim 17 in combination with means responsive to operation of said pulse generating means for blocking the means for detecting radio impulses for the duration of the pulse signal.

SVEN H. M. DODINGTON.

REFERENCES CITED

The following references are of record in the file of this patent:

UNITED STATES PATENTS

| Number | Name | Date |
| --- | --- | --- |
| 2,134,716 | Gunn | Nov. 1, 1938 |
| 2,158,285 | Koch | May 16, 1939 |
| 2,145,332 | Bedford | Jan. 31, 1939 |
| 2,252,083 | Luck | Aug. 12, 1941 |